United States Patent
Suzuki

(10) Patent No.: US 7,275,170 B2
(45) Date of Patent: Sep. 25, 2007

(54) PERFORMANCE CONTROLLER OF ELECTRONIC DEVICE, PERFORMANCE CONTROLLING METHOD AND COMPUTER PROGRAM PRODUCT

(75) Inventor: Tomoyuki Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 310 days.

(21) Appl. No.: 10/764,554

(22) Filed: Jan. 27, 2004

(65) Prior Publication Data

US 2004/0187134 A1 Sep. 23, 2004

(30) Foreign Application Priority Data

Feb. 4, 2003 (JP) ............................. 2003-027133

(51) Int. Cl.
*G06F 1/32* (2006.01)

(52) U.S. Cl. ..................... 713/340; 713/300; 713/310; 713/320; 713/321; 713/323; 713/324; 713/330

(58) Field of Classification Search ................... None
See application file for complete search history.

(56) References Cited

U.S. PATENT DOCUMENTS

| | | | |
|---|---|---|---|
| 6,574,740 B1 * | 6/2003 | Odaohhara et al. ......... | 713/323 |
| 6,654,895 B1 * | 11/2003 | Henkhaus et al. .......... | 713/320 |
| 2005/0108075 A1 * | 5/2005 | Douglis et al. ................ | 705/8 |

FOREIGN PATENT DOCUMENTS

| | | |
|---|---|---|
| JP | 5-307431 A | 11/1993 |
| JP | 11-308777 | 11/1999 |

\* cited by examiner

*Primary Examiner*—A. Elamin
(74) *Attorney, Agent, or Firm*—Staas & Halsey LLP

(57) ABSTRACT

A performance scheduler creates performance schedule of a battery based on use schedule of applications and residual charge level. A mode controller monitors and controls performance levels of a laptop personal computer according to the performance schedule. Further, when a charge counter counts a number of charge cycles of the battery and estimates residual charge level, a reduction in a charging capacity is taken into consideration based on the number of the charging times.

16 Claims, 14 Drawing Sheets

| APPLICATION CATEGORIES | PERFORMANCE LEVEL | POWER CONSUMPTION (WATT) | EXAMPLE |
|---|---|---|---|
| VIDEO EDITOR/ DATA COMPRESSOR (MUSIC etc.) | 12 | 56 | MP3 DV VIDEO EDITOR FILE COMPRESSOR |
| | 11 | 51.5 | |
| | 10 | 47.6 | |
| VIDEO PLAYER | 10 | 47.6 | DVD PLAYER |
| | 9 | 46.5 | |
| | 8 | 41 | |
| GAME | ... | ... | 3D ACTION GAME |
| | ... | ... | |
| | ... | ... | |
| MUSIC PLAYER | ... | ... | MP3 PLAYER CD PLAYER |
| | ... | ... | |
| | ... | ... | |
| WEB BROWSER | ... | ... | WEB BROWSER WEB SEARCHER |
| | ... | ... | |
| OFFICE APPLICATION (DOCUMENT/E-MAIL/ PRESENTATION etc.) | 1 | 6.1 | WORD PROCESSOR PRESENTATION SOFT MAILER |

FIG.4

| APPLICATION CATEGORIES | PERFORMANCE LEVEL | POWER CONSUMPTION (WATT) | EXAMPLE |
|---|---|---|---|
| VIDEO EDITOR/ DATA COMPRESSOR (MUSIC etc.) | 12 | 56 | MP3 |
| | 11 | 51.5 | DV VIDEO EDITOR |
| | 10 | 47.6 | FILE COMPRESSOR |
| VIDEO PLAYER | 10 | 47.6 | DVD PLAYER |
| | 9 | 46.5 | |
| | 8 | 41 | |
| GAME | ... | ... | 3D ACTION GAME |
| MUSIC PLAYER | ... | ... | MP3 PLAYER CD PLAYER |
| WEB BROWSER | ... | ... | WEB BROWSER WEB SEARCHER |
| OFFICE APPLICATION (DOCUMENT/E-MAIL/ PRESENTATION etc.) | 1 | 6.1 | WORD PROCESSOR PRESENTATION SOFT MAILER |

FIG.5

| PERFORMANCE LEVEL / COMPONENT | 12 | ... | 2 | 1 |
|---|---|---|---|---|
| LCD | 3 | | 2 | 1 |
| CPU | 3 | | 1 | 1 |
| HDD | 3 | | 2 | 1 |
| AUDIO | 3 | | 1 | 1 |
| MEMORY | 3 | | 2 | 1 |
| GRAPHIC | 3 | ... | 1 | 1 |
| MODEM | 1 | | 2 | 1 |
| LAN | 1 | | 1 | 1 |
| OPTICAL DRIVE | 3 | | 1 | 1 |
| OTHER | 2 | | 1 | 1 |
| POWER CONSUMPTION (WATT) | 56 | | 23 | 6.1 |

FIG.6

| COMPONENT | CONSUMPTION LEVEL | POWER CONSUMPTION (WATT) |
|---|---|---|
| LCD | 3 | 5 |
| | 2 | 3 |
| | 1 | 1 |
| CPU | 3 | 30 |
| | 2 | 15 |
| | 1 | 1 |
| HDD | 3 | 5 |
| | 2 | 3 |
| | 1 | 1 |
| AUDIO | 3 | 1 |
| | 2 | 0.5 |
| | 1 | 0 |
| MEMORY | 3 | 1 |
| | 2 | 0.5 |
| | 1 | 0.1 |
| GRAPHIC | 3 | 5 |
| | 2 | 3 |
| | 1 | 1 |
| MODEM | 3 | 0.5 |
| | 2 | 0.1 |
| | 1 | 0 |
| LAN | 3 | 0.5 |
| | 2 | 0.1 |
| | 1 | 0 |
| OPTICAL DRIVE | 3 | 3 |
| | 2 | 2 |
| | 1 | 1 |
| OTHERS | 3 | 5 |
| | 2 | 3 |
| | 1 | 1 |

FIG.13

| DATE | TIME | SCHEDULE | USE OF LAPTOP PC |
|---|---|---|---|
| JULY 10 | 3 | | |
| | 6 | | |
| | 9 | MEETING (MEETING ROOM NO. 10) 10: 00 TO 11:00 | PRESENTATION |
| | 12 | | |
| | 15 | | |
| | 18 | BUSINESS TRIP | PLAY VIDEO |
| | 21 | | |
| | 24 | | |
| JULY 11 | 3 | | |
| | 6 | BUSINESS TRIP | WRITE DOCUMENT |
| | 9 | | |
| | 12 | | |
| | 15 | | |
| | 18 | | PRESENTATION |
| | 21 | | |
| | 24 | | |
| ⋮ | ⋮ | ⋮ | ⋮ |
| JULY 20 | 3 | | |
| | 6 | | |
| | 9 | | |
| | 12 | MEETING | BROWSE WEBSITE |
| | 15 | | |
| | 18 | | |
| | 21 | | |
| | 24 | | |

PERFORMANCE CONTROLLER OF ELECTRONIC DEVICE, PERFORMANCE CONTROLLING METHOD AND COMPUTER PROGRAM PRODUCT

BACKGROUND OF THE INVENTION

1) Field of the Invention

The present invention relates to technologies which control performance levels of an electronic device operated by a battery. The invention relates particularly to a performance controller, a performance controlling method, and the computer program product which can operate a battery efficiently according to performance and operating time which are demanded by users for an electronic device driven by the battery.

2) Description of the Related Art

In recent years, according to miniaturization and power saving of electronic devices, utilization of mobile electronic devices such as laptop personal computers (hereinafter, "laptop PCs") increases rapidly. In such mobile electronic devices, it is important to use batteries efficiently, and to lengthen their operating times.

In mobile applications, since battery shutoff during use greatly deteriorates operating efficiency, it is very important for users how long batteries can run, namely, how long the mobile electronic devices can be used. Further, it is also very important for users that the mobile electronic devices can be used while their performance is being maintained as high as possible for a time when batteries keep running.

Normal mobile electronic devices, therefore, have functions which display a percentage of residual charge level of the battery, and when the residual charge level reaches a value equal to or smaller than a predetermined value, give an alarm. Further, normal mobile electronic devices have functions which classify performance of main components such as central processing unit (hereinafter, "CPU") and a liquid crystal display (hereinafter, "LCD"), and electricity consumption in conjunction with the performance by a plurality of levels, and adjust the performance levels so as to adjust the power consumption of mobile electronic devices.

Only with the display of the residual charge level and the adjustment of the performance level of the main components, however, users can only estimate residual battery available time, but cannot know accurate battery available time.

For example, therefore, a following technique is disclosed. In this technique, when users set desired battery operating times, electricity consumption of electronic devices is controlled so that the best performance is given for a time when the operating times are guaranteed (for example, see Japanese Patent Application Laid-open No. H5-307431).

Only when the electricity consumption of the mobile electronic devices is controlled so that the best performance is given for a time when the operating time of batteries are guaranteed, however, the mobile electronic devices are always used with the same performance. This deteriorates the usability of batteries.

That is to say, performance which is required when mobile electronic devices are used greatly differs according to applications to be used. Accordingly, under a condition that the mobile electronic devices are always used with the same performance, the performance becomes insufficient when applications with high load such as video play are executed. Moreover, when applications with low load such as word processing are executed, electric power consumes unnecessarily. In order to improve the usability of batteries to be used in mobile electronic devices, therefore, it is important to control the performance level after the load of applications to be executed is taken into consideration.

SUMMARY OF THE INVENTION

It is an object of the present invention to at least solve the problems in the conventional technology.

A performance controller according to one aspect of the present invention includes a performance scheduler that creates a performance schedule showing a plurality of performance levels of an electronic device, based on a charge level of a battery used in the electronic device and a table of times at which application programs are executed in the electronic device; and a mode controller that sets operation modes of components of the electronic device based on the performance schedule.

A performance controller according to another aspect of the present invention includes a storage unit that stores a performance schedule showing a plurality of performance levels of the electronic device, the performance schedule being created based on a charge level of a battery used in the electronic device and a table of times at which application programs are executed in the electronic device; and a mode controller that sets operation modes of components of the electronic device based on the performance schedule.

An electronic device according to still another aspect of the present invention is operated by a battery. The electronic device includes a performance scheduler that creates a performance schedule showing a plurality of performance levels of the electronic device, based on a charge level of the battery and a table of times at which application programs are executed in the electronic device; and a mode controller that sets operation modes of components of the electronic device based on the performance schedule.

An electronic device according to still another aspect of the present invention is operated by a battery, and includes a storage unit that stores a performance schedule showing a plurality of performance levels of the electronic device, the performance schedule being created based on a charge level of the battery and a table of times at which application programs are executed in the electronic device; and a mode controller that sets operation modes of components of the electronic device based on the performance schedule.

A method according to still another aspect of the present invention is of controlling performance levels of an electronic device. The method includes creating a performance schedule that shows a plurality of performance levels of the electronic device, based on a charge level of a battery used in the electronic device and a table of times at which application programs are executed in the electronic device; and setting operation modes of components of the electronic device based on the performance schedule.

A method according to still another aspect of the present invention is of controlling performance levels of an electronic device, and includes acquiring from a storage unit a performance schedule showing a plurality of performance levels of the electronic device, the performance schedule being created based on a charge level of a battery used in the electronic device and a table of times at which application programs are executed in the electronic device; and setting operation modes of components of the electronic device based on the performance schedule.

The computer program product according to still another aspect of the present invention realizes the method according to the present invention on a computer.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 4 is an illustration of content stored in a performance level storage unit;

FIG. 5 is an illustration of a control pattern;

FIG. 6 is an illustration of content stored in a power consumption storage unit;

FIG. 13 is an illustration of a timetable to be used by a performance scheduler of the performance controller.

DETAILED DESCRIPTION

Exemplary embodiments of a performance controller, a performance controlling method, and a computer program product relating to the present invention will be explained in detail below with reference to the accompanying drawings.

In the embodiments, the case where the present invention is applied to laptop PCs in which a battery is installed, is explained.

Figure 1:
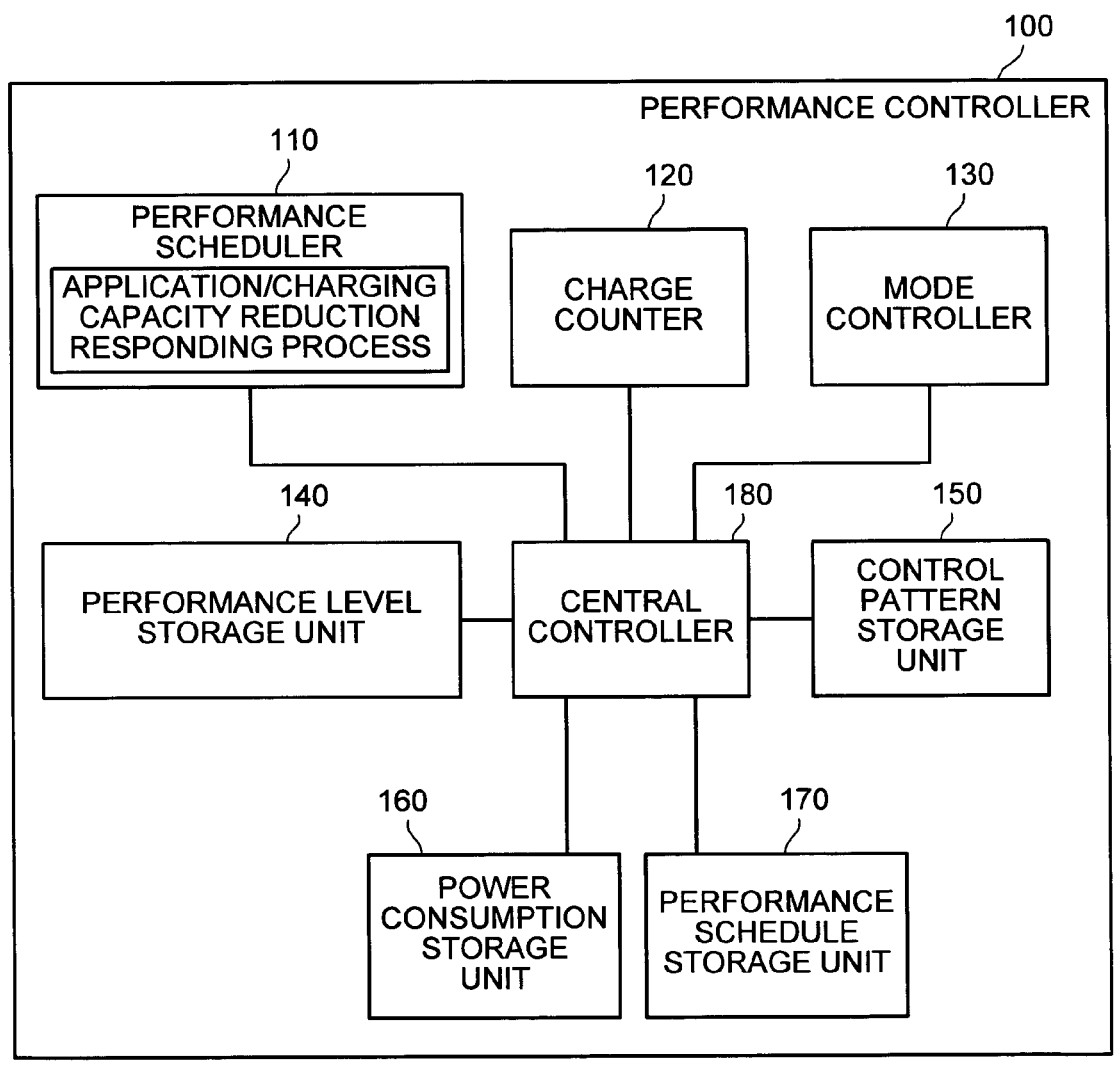
FIG. 1 is a functional block diagram of a performance controller according to a first embodiment.

A constitution of the performance controller according to a first embodiment is explained below. FIG. 1 is a functional block diagram of the performance controller according to the first embodiment. As shown in FIG. 1, the performance controller 100 includes an performance scheduler 110, a charge counter 120, a mode controller 130, a performance level storage unit 140, a control pattern storage unit 150, a power consumption storage unit 160, a performance schedule storage unit 170, and a central controller 180.

The performance scheduler 110 is a processing section that creates a daily performance schedule of a laptop PC based on an application program to be used and a charge level of the battery. Namely, the performance scheduler 110 takes a performance level required by the application program to be used into consideration, determines a performance level of the laptop PC for a time when the application program is executed, and creates a charge level schedule.

Figure 2:
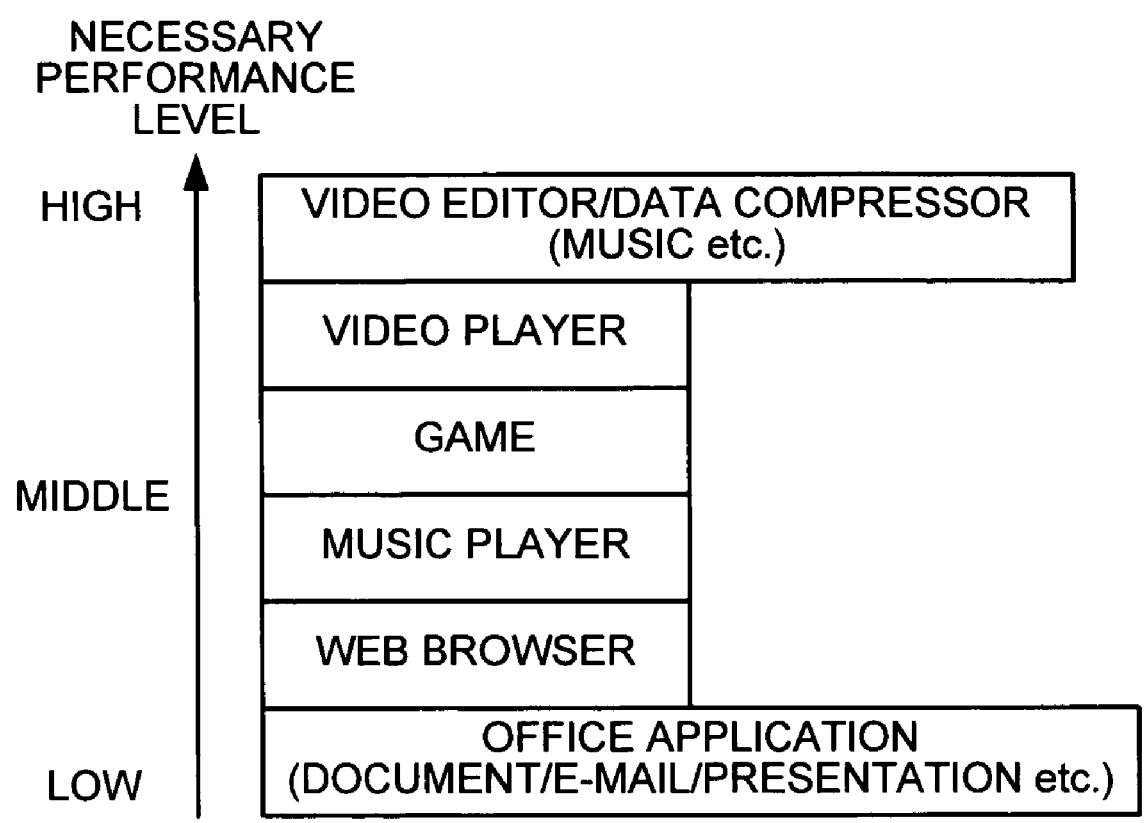
FIG. 2 is an illustration of classification of applications based on a necessary performance level.

FIG. 2 is an illustration of classification of application programs based on necessary performance level. As shown in FIG. 2, video editors, and data compressors (music data etc.) require a high performance level. The performance levels of video players, games, music players, Web browsers, and office applications become lower in this order. Further, the application programs with higher necessary performance level consume more electric power.

The performance scheduler 110, therefore, does not create a performance schedule that all the application programs are executed at the same performance level based on residual charge level and scheduled execution time. The performance scheduler 110 creates the performance schedule that the application programs which require the high performance level are executed in an operation mode with large electric power consumption, and the application programs which require the low performance level are executed in an operation mode with small electric power consumption. The performance scheduler 110 measures an electric current of the battery, and calculates an internal voltage based on the measured electric current and impedance in the battery so as to obtain residual charge level of the battery. The performance scheduler 110 obtains the residual charge level by taking a reduction in the battery charging capacity caused by repetition of charging and discharging of the battery into consideration. This is because a difference in the charging capacity of the battery greatly influences the residual charge level.

Figure 3:
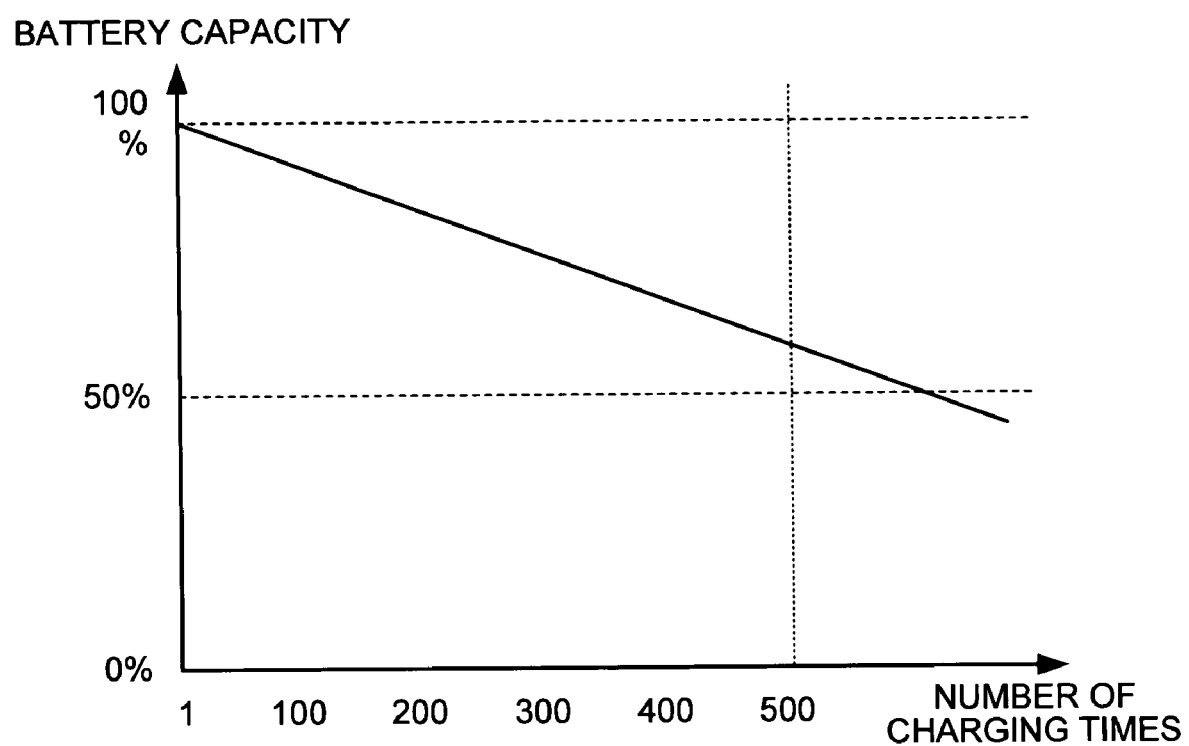
FIG. 3 is an illustration of a decrease in charging capacity of a battery.

FIG. 3, for example, is an illustration of the reduction in the charging capacity of the battery. As shown in FIG. 3, the charging capacity of the battery is reduced by 50% after about 600 charge cycles. In order to estimate the residual charge level correctly, therefore, it is important to take the reduction in the charging capacity of the battery into consideration. The performance scheduler 110 creates the performance schedule of the battery after taking the applications to be used and the reduction in the charging capacity of the battery into consideration. This enables the battery operation which simultaneously meets both performance demands and operating time demands on laptop PCs by users.

In FIG. 1, the charge counter 120 is a processing section that monitors the charging of the battery so as to count a number of charge cycles. When the charge cycles are equal to or larger than a predetermined value, the charge counter 120 notifies to a user a warning message warns that indicates a reduction in the charging capacity, and prompts the user to replace the battery with new one. The charge cycles counted by the charge counter 120, as shown in FIG. 3, are in relation to a percentage of the reduction in the charging capacity of the battery. The charge cycles are used for estimating the residual charge level.

The mode controller 130 is a processing section that monitors and controls use of the laptop PC operated by the battery. Specifically, the mode controller 130 sets an operation mode of a component composing the laptop PC according to the performance schedule of the battery created by the performance scheduler 110, and monitors whether actual residual charge level changes according to scheduled residual charge level. The mode controller 130 sets the operation mode of the component composing the laptop PC according to the performance schedule of the battery, and controls the electricity consumption of the laptop PC. As a result, the laptop PC can be used for schedules hours with scheduled performance.

The performance level storage unit 140 stores the performance levels and the power consumption of the laptop PC necessary for executing the application programs according to categories of the application programs.

FIG. 4 is an illustration of content stored in the performance level storage unit 140. As shown in FIG. 4, the performance level storage unit 140 stores the performance levels and the power consumption required by the application programs according to the categories which include video editors, data compressors (music data etc.), video player and the like shown in FIG. 2. For example, in order to execute a digital video disk (hereinafter, "DVD") video editor, it is necessary to operate the laptop PC at the performance level of "12", "11" or "10", and the power consumption at this time is 56 Watts, 51.5 Watts or 47.6 Watts.

The application programs in the categories can be executed at a plurality of performance levels. When the residual charge level is sufficient, the applications are executed at the highest performance level, and when the residual charge level is insufficient, the applications are executed in such a manner that the performance level is lowered within a range of the performance levels stored in the performance level storage unit 140.

The control pattern storage unit 150 stores the performance levels of the laptop PC and the power consumption levels of its components as control patterns in a related manner. The control pattern storage unit 150 is used when the mode controller 130 obtains the power consumption levels of the components based on the performance levels.

FIG. 5 is an illustration of content stored in the control pattern storage unit 150. As shown in FIG. 5, the control pattern storage unit 150 stores the electricity consumption levels of LCD, CPU, hard disk drive (hereinafter, "HDD"), audio, memory, graphic, modem, local area network (hereinafter, "LAN"), optical drive, and the like as the components of the laptop PC therein as the control patterns. The electricity consumption levels are related to the performance levels.

The electricity consumption levels are integral numbers including "1" to "3". When the electricity consumption level is "1", it means that the components are operated in an operation mode with the least electricity consumption, and when the level is "3", it means that the components are operated in an operation mode with the most electricity consumption. The control pattern storage unit 150 stores the power consumption of the entire laptop PC when the laptop PC is used at the respective performance levels. For example, when the laptop PC is used at the performance level of "12", the power consumption is 56 Watts, and when the laptop PC is used at the performance level of "1", the power consumption is 6.1 Watts. The power consumption storage unit 160 stores the electricity consumption levels of the components in the laptop PC and the power consumption therein in a related manner.

FIG. 6 is an illustration of content stored in the power consumption storage unit 160. As shown in FIG. 6, for example, in an LCD, when the electricity consumption level is "3", the power consumption is 5 Watts, and when the electricity consumption level is "1", the power consumption is 1 Watt. The power consumption storage unit 160 is used to, when a user changes the control patterns to be stored in the control pattern storage unit 150 shown in FIG. 5, or adds a new performance level, calculate the power consumption of the changed or added performance level and store it into the control pattern storage unit 150.

The performance schedule storage unit 170 stores the performance schedule created by the performance scheduler 110. Specifically, it stores the performance levels of the laptop PC and scheduled residual charge level for respective execution times therein. The performance schedule stored in the performance schedule storage unit 170 is used for monitoring and controlling the operation of the battery via the mode controller 130.

The central controller 180 is a processing section that controls the entire performance controller 100. Specifically, the central controller 180 assigns control between functional sections, exchanges data between the functional sections and the storage sections so as to function the performance controller 100 as one device.

Figure 7:
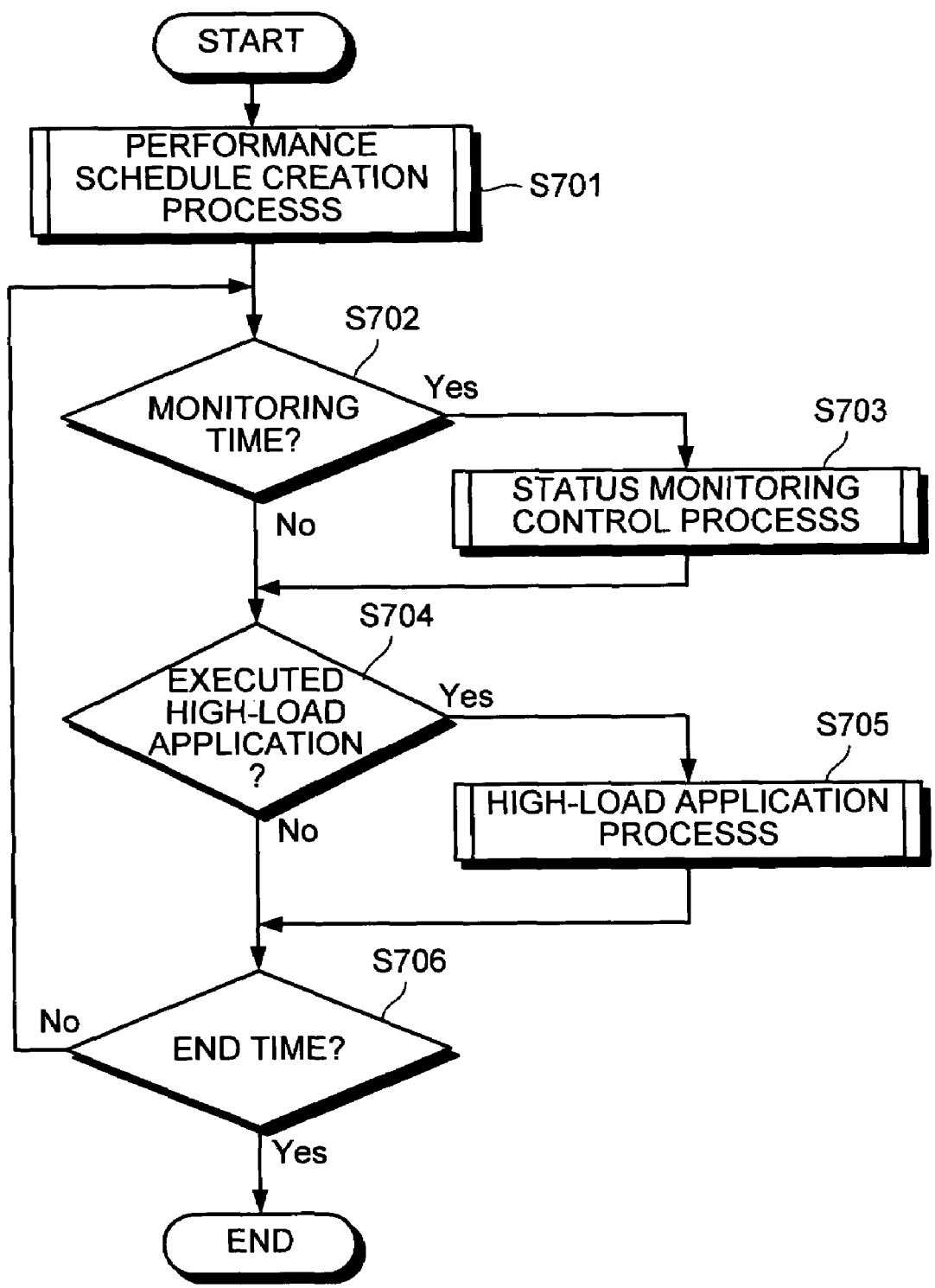
FIG. 7 is a flowchart illustrating a processing procedure of the performance controller according to the first embodiment.

A processing procedure of the performance controller 100 according to the first embodiment is explained below. FIG. 7 is a flowchart illustrating the processing procedure of the performance controller 100 according to the first embodiment. As shown in FIG. 7, the performance controller 100 receives an instruction from a user, so as to create a daily performance schedule of the laptop PC according to a performance schedule creation process (step S701).

The performance schedule creation process corresponds to the process to be executed by the performance scheduler 110. When the process reaches the stage of using the laptop PC to be operated by the battery, the mode controller 130 checks whether monitoring time comes (step S702), and when the monitoring time comes (Yes at step S702), the operation of the battery is checked and necessary control is made according to a status monitoring control process (step S703).

The monitoring time is set at half an hour intervals, for example, 10:00 and 10:30. This, however, is not applied to the time before the first scheduled operating time of the laptop PC. Further, when the laptop PC is actuated after the monitoring time, the point of the actuating time is determined as the first monitoring time, and when the field of "minute" in the time indicates "0" or "30", the monitoring time comes. Another time such that the field of "minute" in time indicates "10" can be set as the monitoring time, or the monitoring time can be set at fifteen-minute intervals.

The mode controller 130 monitors execution of unscheduled high-load application programs (step S704), and when unscheduled high-load application programs are executed (Yes at step S704), it executes a process that notifies a warning to the user according to a high-load application process (step S705). The high-load application programs are such that load required for execution is high.

The mode controller 130 check whether operating end time of the laptop PC comes (step S706), and when the operating end time comes (Yes at step S706), the process is ended. On the other hand, when the operating end time does not come (No at step S706), the process that continues the monitoring after step S702 is repeated.

Figure 8:
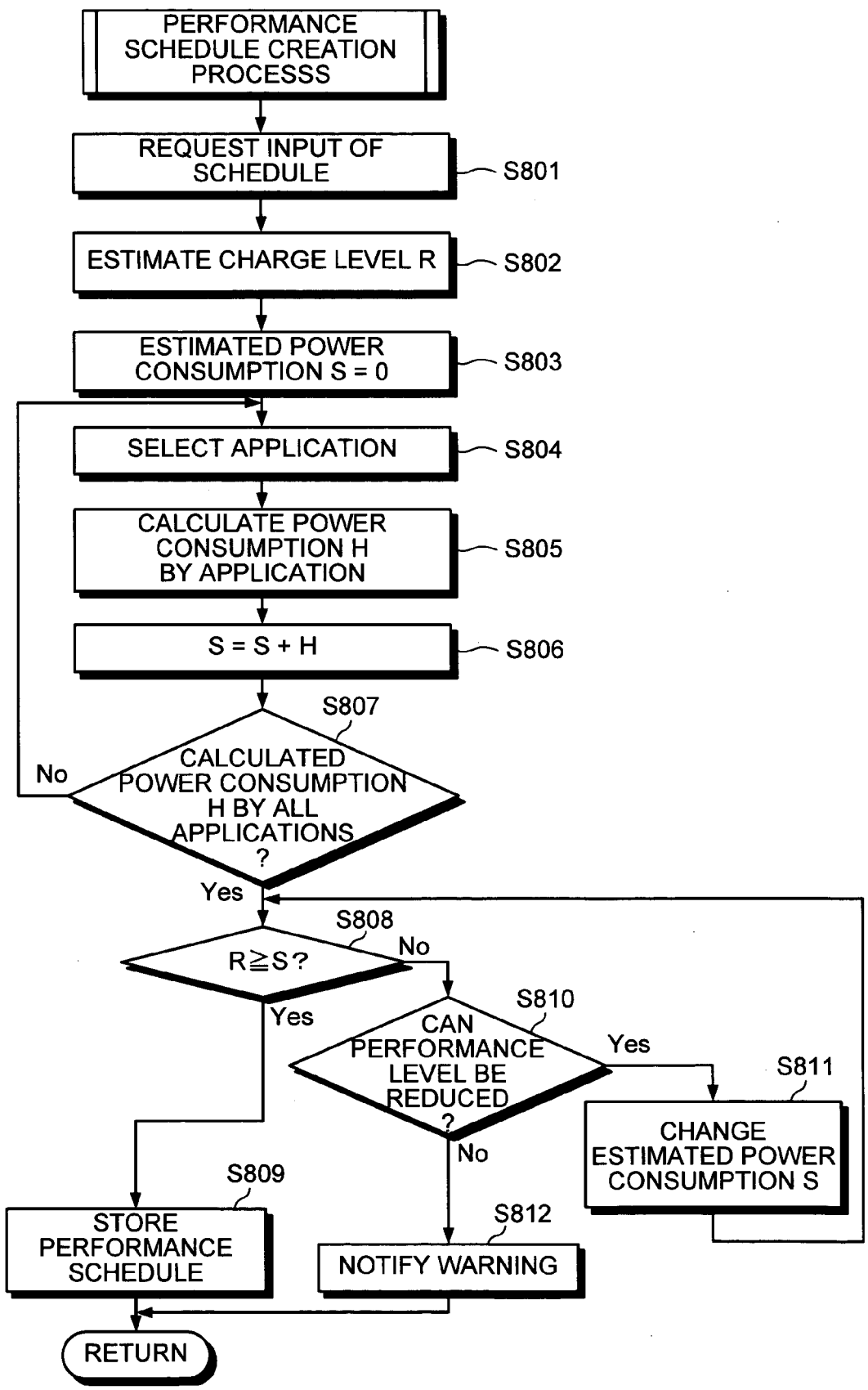
FIG. 8 is a flowchart illustrating a processing procedure of a performance schedule creation process shown in FIG. 7.

A procedure of the performance schedule creation process (step S701) shown in FIG. 7 is explained below. FIG. 8 is a flowchart illustrating the procedure of the performance schedule creation process shown in FIG. 7. As shown in FIG. 8, at the performance schedule creation process, the user is requested to input a name of an application program to be used and the operating starting time and operating end time (step S801). A reduction in the charging capacity of the battery caused by the repetition of the charging and discharging is taken into consideration, and residual charge level R is estimated (step S802).

The predicted power consumption is initialized to "0" (step S803), and one application input by the user is selected (step S804). The power consumption at the time of executing the selected application program at the highest performance level is taken out from the performance level storage unit 140. The taken-out power consumption is multiplied by the hours so that power consumption H is calculated (step S805) and is added to the predicted power consumption S (step S806). A check is made whether the power consumption H of all the application programs to be used is obtained (step S807).

When the power consumption H of all the application programs is not obtained (No at step S807), the process returns to step S804, so that the power consumption H of the next application program is obtained. On the other hand, the power consumption H of all the application programs is obtained (Yes at step S807), the residual charge level R is compared with the calculated predicted power consumption S.

A determination is made whether the residual charge level R is equal to or more than the calculated and predicted power consumption S (step S808). As a result, when the residual charge level R is equal to or more than the predicted power consumption S (Yes at step S808), the starting time, the end time, and the performance levels of the application programs, and predicted residual charge level at the monitoring time are stored in the performance schedule storage unit 170 (step S809). On the other hand, when the residual charge level R is less than the predicted power consumption S (No at step S808), a check is made whether an application program which can reduce the performance level used for calculation of the predicted power consumption S is present (step S810).

When the application program which cab reduce the performance level is present (Yes at step S810), the performance level of the application program is reduced, and the predicted power consumption S is corrected based on the reduced performance level (step S811). The residual charge level R is again compared with the corrected and predicted power consumption S, and a determination is made whether the residual charge level R is equal to or more than the corrected predicted power consumption S (step S808).

On the contrary, when no application program which can reduce the performance level is present (No at step S810), the residual charge level which is required for executing the application programs according to a table does not remain, the user is warned to charge the battery (step S812).

The performance scheduler 110 estimates residual charge level by taking the reduction in the charging capacity caused by the repetition of the charging and discharging into consideration. Further, the performance scheduler 110 creates the performance schedule based on the estimated residual charge level, and the application program to be used by the user and the execution time of the application program. As a result, the battery can be operated efficiently.

Figure 9:
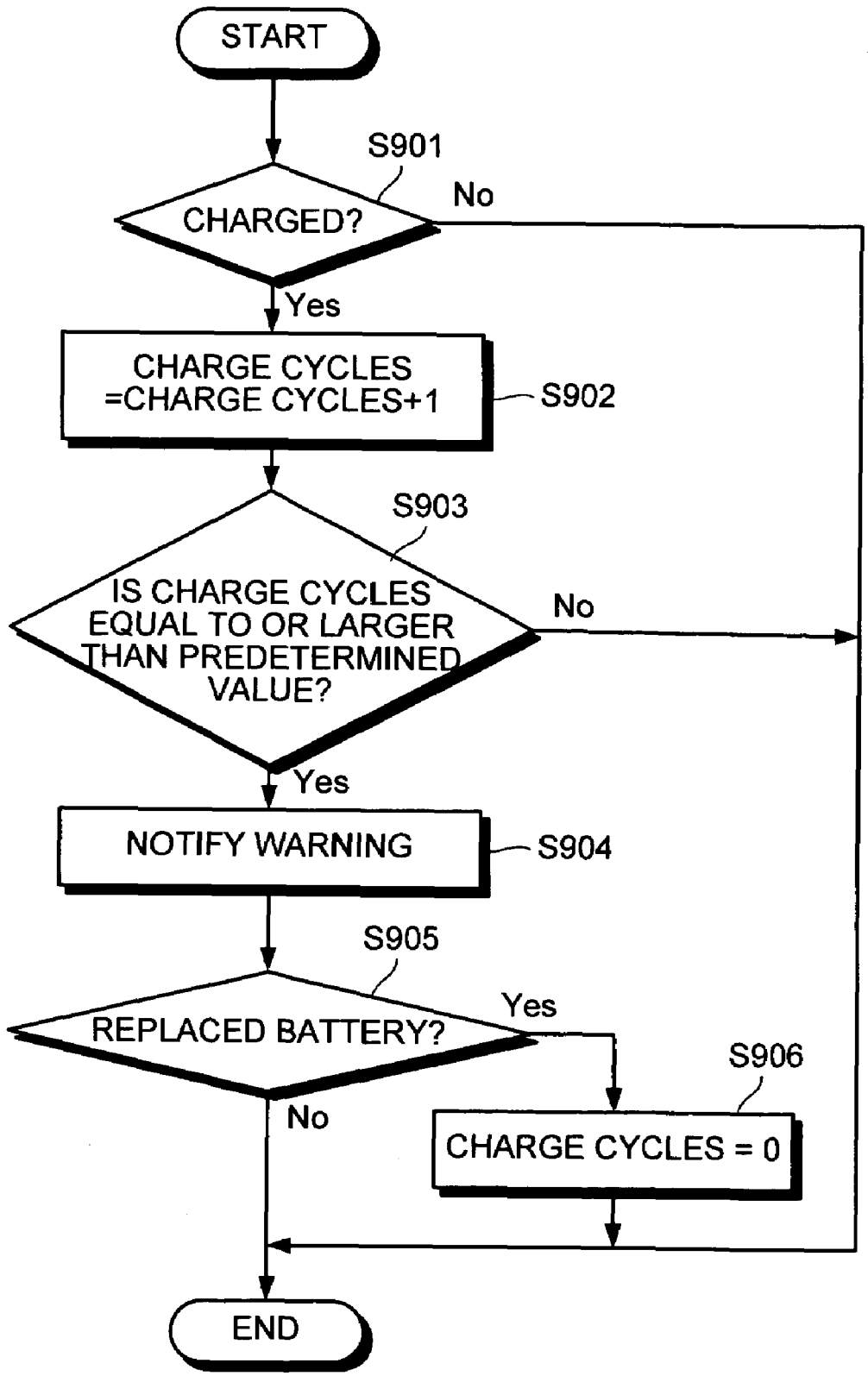
FIG. 9 is a flowchart illustrating a processing procedure of a charge counter shown in FIG. 1.

A processing procedure of the charge counter 120 shown in FIG. 1 is explained below. FIG. 9 is a flowchart illustrating the processing procedure of the charge counter 120 shown in FIG. 1. As shown in FIG. 9, the charge counter 120 monitors whether the battery is charged (step S901). When the battery is charged (Yes at step S901), the number of charge cycles is increased by "1" (step S902), and a check is made whether the number of charge cycles is equal to larger than a predetermined value (step S903). As a result, when the number of charge cycles is equal to or larger than the predetermined value (Yes at step S903), a warning message that the charging capacity of the battery is reduced and replacement is recommended is notified to the user (step S904).

When the user replaces the battery with new one (Yes at step S905), the number of charge cycles is initialized to "0" (step S906). When the user does not replace the battery with new one (No at step S905), the number of charge cycles is smaller than the predetermined value (No at step S903), and the battery is not charged (No at step S901). The process is then ended.

The charge counter 120 counts the number of charge cycles, so that the performance scheduler 110 obtains a percentage of the reduction in the charging capacity using the number of charge cycles. The residual charge level can be estimated accurately by using the obtained percentage of the reduction in the charging capacity.

Figure 10:
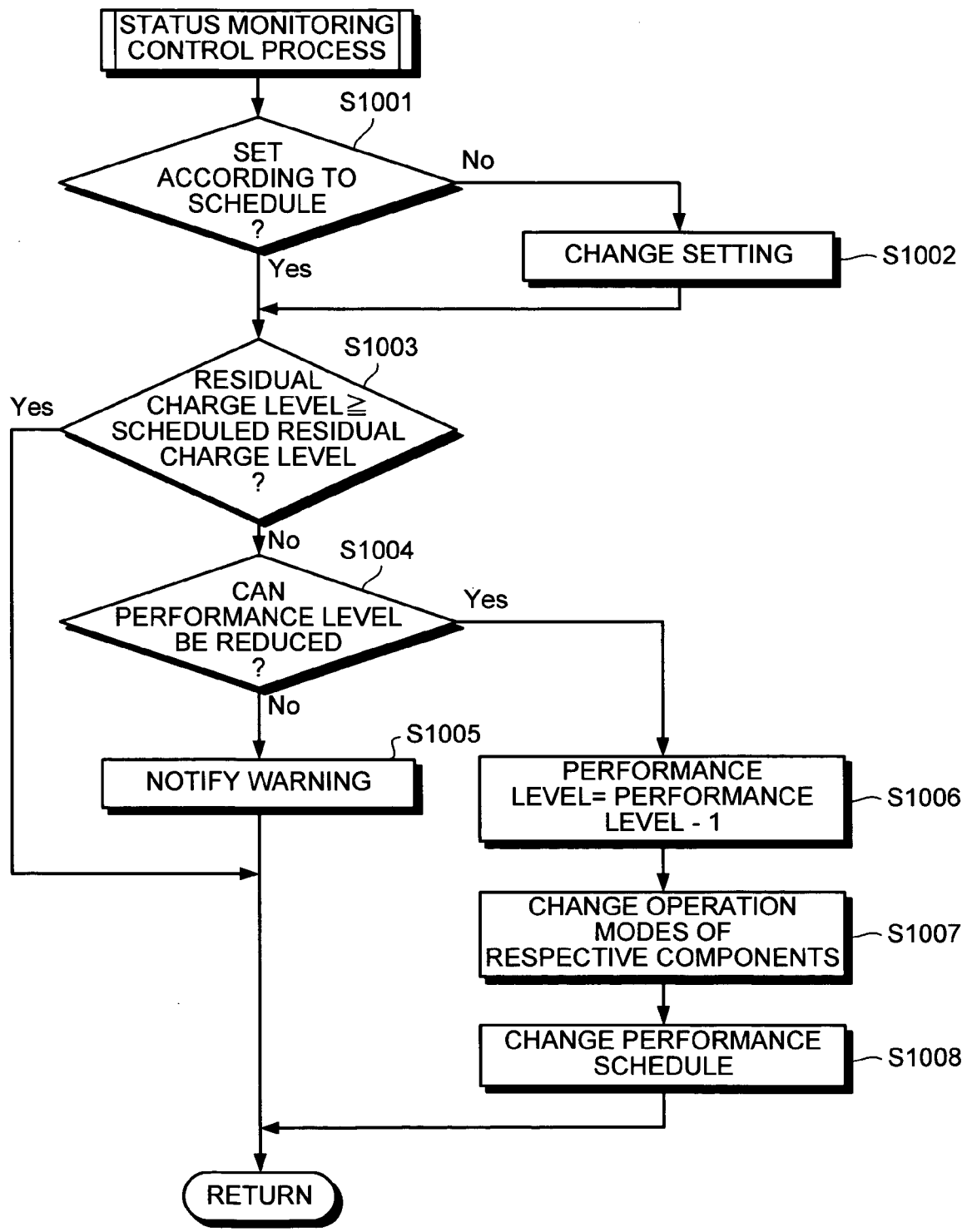
FIG. 10 is a flowchart illustrating a procedure of a status monitoring control process shown in FIG. 7.

A procedure of the status monitoring control process (step S703) shown in FIG. 7 is explained below. FIG. 10 is a flowchart illustrating the procedure of the status monitoring control process shown in FIG. 7.

As shown in FIG. 10, at the status monitoring control process, a check is made whether the performance levels of the laptop PC are set according to the schedule stored in the performance schedule storage unit 170 (step S1001). When the performance levels are not set in such a manner (No at step S1001), the setting is changed (step S1002).

Specifically, an electricity consumption level of the components which responds to the performance level is obtained by using the control pattern storage unit 150. The operation modes of the components are set so that the components are operated at the obtained electricity consumption level.

A check is made whether the actual residual charge level is equal to or more than the scheduled residual charge level stored in the performance schedule storage unit 170 (step S1003). When the actual residual charge level is equal to or more than the scheduled residual charge level (Yes at step S1003), the battery can be operated as heretofore, and thus the monitoring process is ended.

On the other hand, when the actual residual charge level is less than the scheduled residual charge level (No at step S1003), if the battery is operated at this rate, the battery is shutoff. Accordingly, a check is made whether the performance level can be reduced within the range of the performance level responding to the requirements of the application program in the executing state (step S1004).

As a result, when the performance level cannot be reduced within the range of the performance level responding to the requirements of the application program in the executing state (No at step S1004), a warning of less residual charge level is output to the user (step S1005).

On the contrary, when the performance level can be reduced with the range of the performance level responding to the requirements of the application program in the executing state (Yes at step S1004), the performance level is reduced by 1 (step S1006). The operation mode of the components is changed so that the electricity consumption level responds to the reduced performance level (step S1007). The scheduled residual charge level is recalculated, and the performance schedule is changed based on the recalculation (step S1008).

Figure 11:
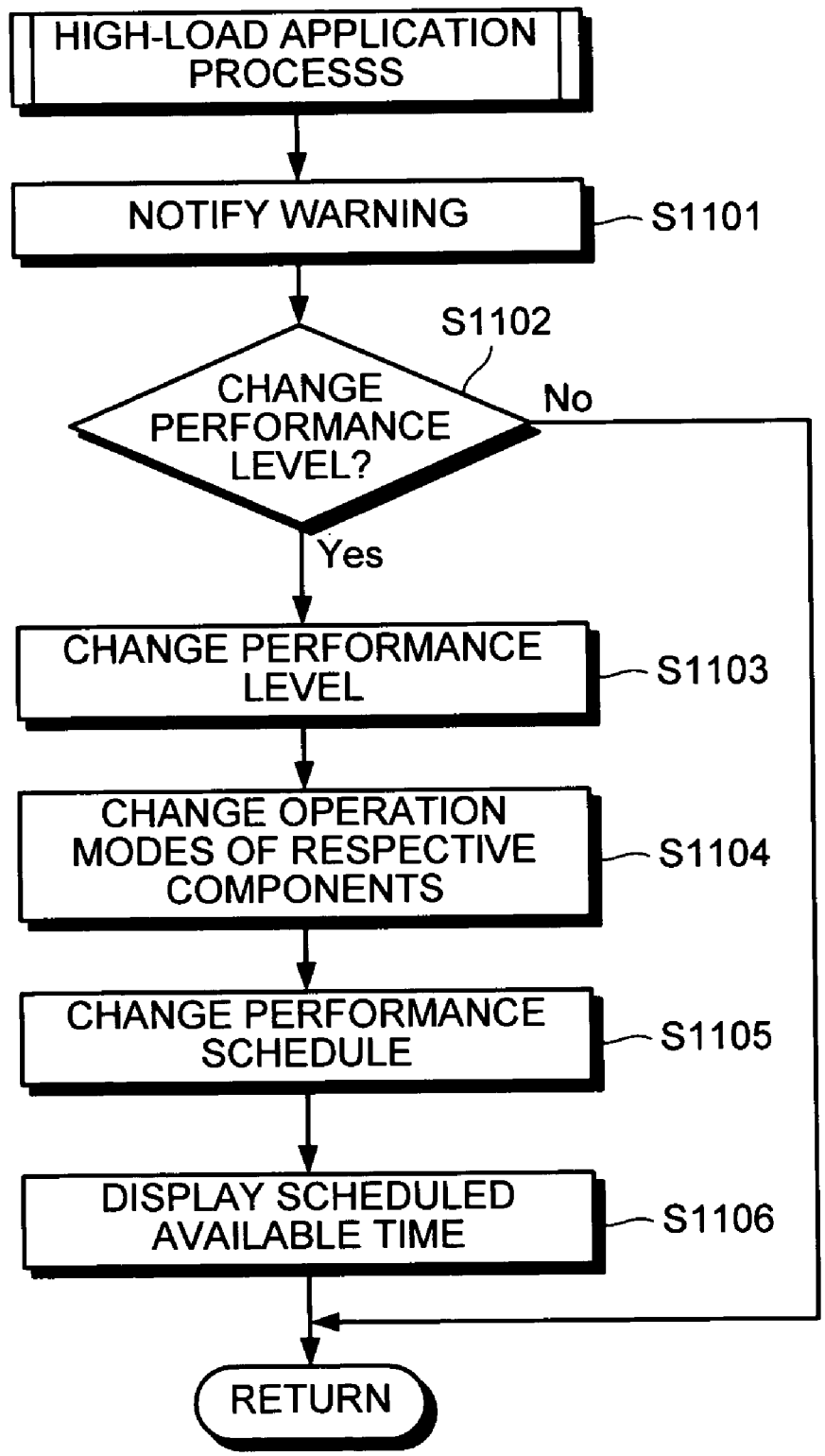
FIG. 11 is a flowchart illustrating a procedure of a high-load application process shown in FIG. 7.

A procedure of the high-load application process (step S705) shown in FIG. 7 is explained below. FIG. 11 is a flowchart illustrating the procedure of the high-load application process shown in FIG. 7.

As shown in FIG. 11, at the high-load application process, the user is warned that an unscheduled high-load application is executed (step S1101). The user is asked whether the performance level is changed into a performance level required by the application (step S1102). As a result, when the user does not select changing of the performance level (No at step S1102), the performance level is not changed, and the process is ended. On the other hand, when the user selects the changing of the performance level (Yes at step S1102), the performance level is changed into the lowest performance level required by the application program (step S1103). The operation mode of the components is changed so that the electricity consumption level responds to the changed performance level (step S1104). The scheduled residual charge level is recalculated, and the performance schedule is changed based on the recalculation (step S1105), and further scheduled available time is displayed (step S1106).

In the first embodiment, the performance scheduler 110 creates the performance schedule of the laptop PC based on the table of times at which the application programs are executed and the residual charge level.

The mode controller 130 monitors and controls the performance levels of the laptop PC according to the performance schedule. Accordingly, the battery can be operated efficiently according to the performance demands and operating time demands by the user. In the first embodiment, the performance scheduler 110 creates the residual charge level schedule based on the table of times at which the application programs are executed and the residual charge level. The mode controller 130 monitors and controls whether the battery is consumed according to the residual charge level schedule.

Accordingly, a reduction in the residual charge level which deviates from the performance schedule of the battery is detected so that unscheduled shutoff of the battery can be prevented. In the first embodiment, when the charge counter 120 counts the number of charge cycles of the battery so as to estimate the residual charge level, the reduction in the charging capacity is taken into consideration based on the number of the charging times. Therefore, the residual charge level can be estimated accurately, and the battery can be operated more accurately.

In the first embodiment, the performance scheduler 110 creates the performance schedule of the laptop PC and the residual charge level schedule, and the mode controller 130 monitors and controls the setting of the performance levels of the laptop PC and the residual charge level. The present invention is not, however, limited to this. When the performance scheduler 110 creates only the performance schedule of the laptop PC, and the mode controller 130 monitors and controls only the setting of the performance levels of the laptop PC, the present invention can be applied similarly to this situation.

In the first embodiment, further, the performance schedule on the day on which the user instructs the performance controller 100 to create the performance schedule is created. The present invention is not, however, limited to this. The present invention can be applied similarly to a situation that the user specifies a battery operating end scheduled day and the performance schedule is created for two or more days.

In the first embodiment, the laptop PC as an example of the mobile electronic devices has the performance scheduler 110 and it creates the performance schedule. The present invention is not, however, limited to this.

For example, a device different from the laptop PC has the performance scheduler 110, and the created performance schedule is stored in the storage device (a memory or a hard disc) of the laptop PC having the mode controller 130. The mode controller 130 acquires the performance schedule stored in the storage device so as to set the operation mode or the like. In this case, the respective pieces of the information stored in the performance level storage unit 140, the control pattern storage unit 150, and the power consumption storage unit 160 in the first embodiment are constituted so as to be capable of being used in the device having the performance scheduler 110. As a result, needless to say, the performance scheduler 110 which is operated in the device can create the performance schedule.

In the first embodiment, when the performance schedule is created, the user inputs the table of times at which the application programs are executed. The table schedule of the application programs can be, however, input in a manner that it and a timetable interlock.

In a second embodiment, therefore, the table of the application programs is input in conjunction with a user personal timetable.

Figure 12:
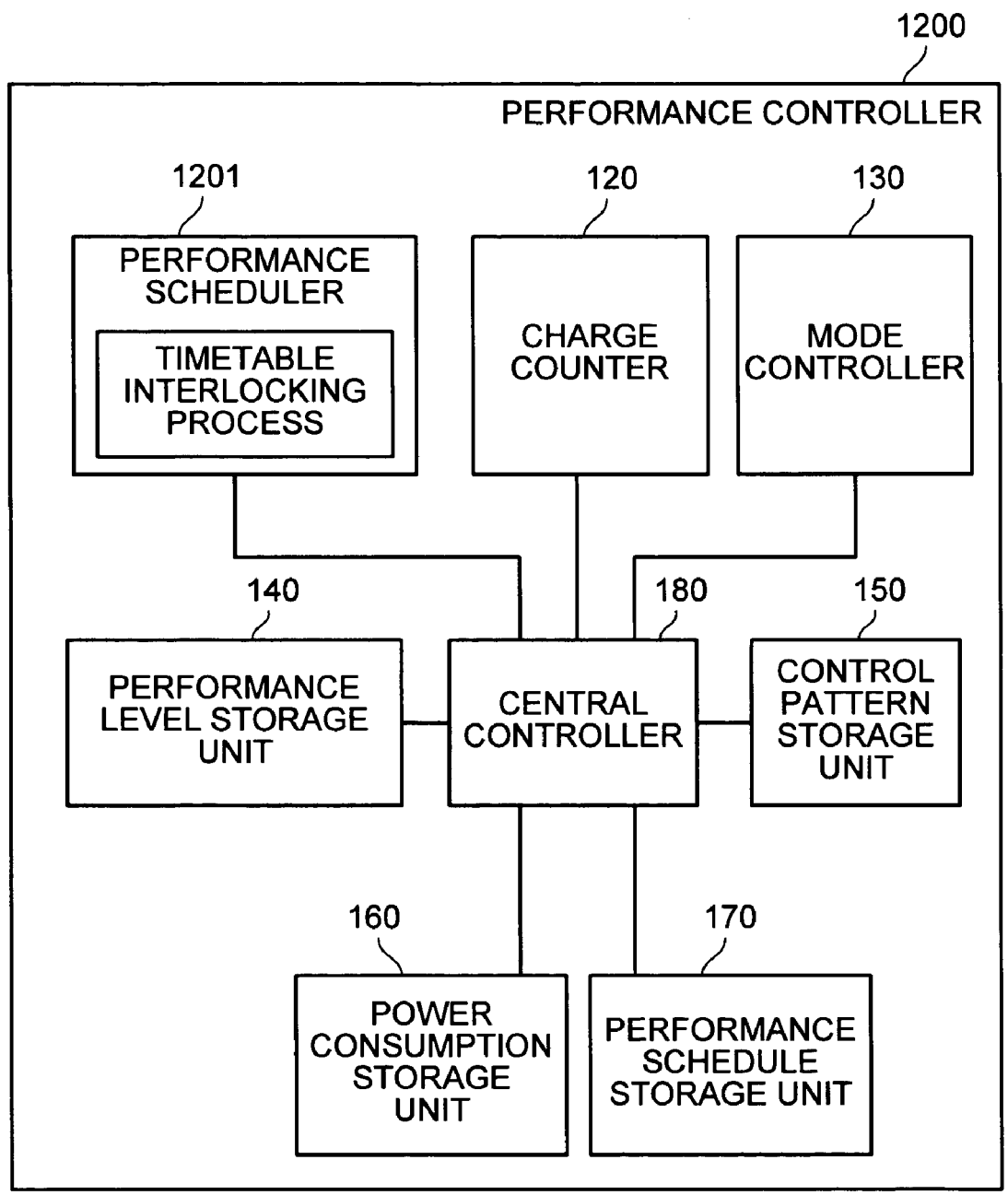
FIG. 12 is a functional block diagram of a performance controller according to a second embodiment.

FIG. 12 is a functional block diagram of a performance controller according to the second embodiment. For convenience of the explanation, the functional portions which serve similarly to the portions shown in FIG. 1 are designated by the same numerals, and the detailed explanation thereof is omitted.

As shown in FIG. 12, the performance controller 1200 has a performance scheduler 1201 instead of the performance scheduler 110 of the performance controller 100. The performance scheduler 1201 is a processing section that creates the battery performance schedule based on the timetable created by schedule management software. That is to say, the performance scheduler 1201 obtains daily service schedule of the laptop PC from the timetable, and creates the performance schedule so that the obtained the table is fulfilled. FIG. 13 is the timetable to be used by the performance scheduler 1201. As shown in FIG. 13, in this timetable, spaces for the use of the laptop PC are provided so as to be related to the schedule, and the user writes a name of an application to be used in the spaces for the use of the laptop PC.

For example, on Jul. 10, the schedule includes preliminary meeting at 10:00 to 11:00, and the presentation software is used for one hour. The schedule includes business journey at 18:00, and a video player is used. In this schedule, however, since time is not written, the video player is supposed to be used for three hours based on time segments in the time spaces.

When time is not specified, the execution time is estimated based on the time segments in the time spaces here, but for example, the execution time can be set to 2 hours as a default value not based on the time segments in the time spaces. In the second embodiment, the performance scheduler 1201 inputs the timetable created by using the schedule management software, and creates the battery performance schedule based on the application described in the input timetable. Accordingly, input by the user is eliminated, so that the performance schedule can be automatically created.

For example, when the user starts the use of the laptop PC according to the driving of the battery, the performance schedule is created on that day by using the timetable, and the performance schedule can be monitored and controlled automatically.

The second embodiment explains that names of application programs to be used are written in the timetable, but the present invention is not limited to this. For example, the present invention can be applied similarly to the case where the categories of the applications showing FIG. 4 are written in the timetable. The first and the second embodiments explain the performance controller, but the constitution of the performance controller is realized by software so that the battery operation control program having the similar function can be obtained. A computer system which executes the battery operation control program is, therefore, explained.

Figure 14:
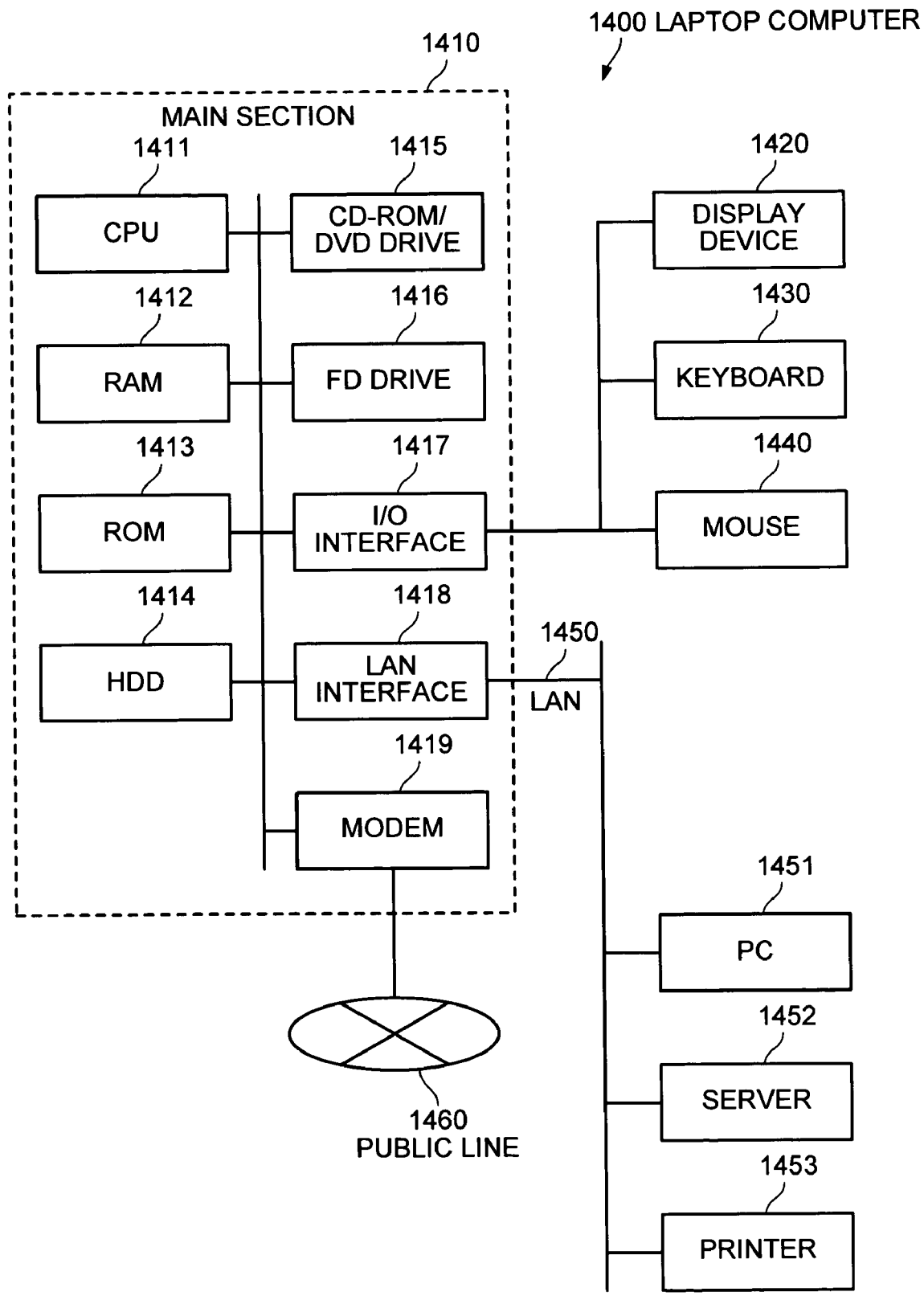
FIG. 14 is a functional block diagram of a laptop PC which executes a computer program that realizes methods according to the first and the second embodiments.

FIG. 14 illustrates the laptop PC which executes the battery operation control program according to the first and the second embodiments. As shown in FIG. 14, the laptop PC 1400 includes a main body section 1410, a display device 1420 which displays a display screen according to an instruction from the main body section 1410, a keyboard 1430 which inputs various information into the laptop PC 1400, and a mouse 1440 which specifies a position on the display screen.

The main body section 1410 includes a CPU 1411, a random access memory (hereinafter, "RAM") 1412, a read only memory (hereinafter, "ROM") 1413, an HDD 1414, a CD-ROM/DVD drive 14415, a floppy disk (hereinafter, "FD") drive 1416, an I/O interface 1417, a LAN interface 1418, and a modem 1419.

The laptop PC 1400 can be connected with another computer system (PC) 1451, a server 1452, a printer 1453, and the like via a LAN 1450 connected with the LAN interface 1418. The laptop PC 1400 can be connected with a public line 1460 via the modem 1419. The battery operation control program which is executed in the laptop PC 1400 is stored in a portable storage medium such as an FD, a CD-ROM, a DVD disc, a magneto-optical disc, or an IC card. The battery operation control program is read from the storage medium so as to be installed into the laptop PC 1400.

Alternatively, the battery operation control program is stored in a database of the server 1452 connected via the LAN interface 1418, a database of another computer system (PC) 1451, a database of another computer system connected via the public line 1460, or the like. The battery operation control program is read from such a database, so as to be installed into the laptop PC 1400.

The installed battery operation control program is stored in the HDD 1414, and is executed by the CPU 1411 by utilizing the RAM 1412, the ROM 1413, and the like.

According to the present invention, the setting schedule of the performance of the electronic device is created based on the executing schedule of the applications to be executed in the electronic device and the residual charge level, and the operation modes of the portions composing the electronic device are set based on the created setting schedule. Accordingly, the battery can be operated efficiently according to the performance demands and the service time demands on the electronic device driven by the battery from a user.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A performance controller comprising:
   a performance scheduler that creates a performance schedule showing a plurality of performance levels of an electronic device, based on a charge level of a battery used in the electronic device and a table of times at which application programs are executed in the electronic device; and
   a mode controller that sets operation modes of components of the electronic device based on the performance schedule.

2. The performance controller according to claim 1, wherein
   the performance scheduler further creates a charge level schedule showing change in the charge level; and
   the mode controller sets the operation modes based on a comparison of an actual charge level of the battery with the charge level schedule.

3. The performance controller according to claim 1, further comprising a charge counter that counts charge cycles of the battery, wherein
   the performance scheduler estimates the charge level based on the charge cycles, and creates the performance schedule based on the charge level estimated.

4. The performance controller according to claim 1, wherein
   the table is an application schedule showing application programs that are registered in a timetable, and the timetable is recorded in the electronic device by a user of the electronic device.

5. The performance controller according to claim 4, wherein
   the application programs are classified into a plurality of categories based on load required for executing the application programs, and
   the performance scheduler determines the application schedule by estimating the application programs from names of the categories that are registered in the timetable.

6. The performance controller according to claim 1, wherein
   the performance scheduler estimates power consumption of the electronic device based on the table, and notifies a warning to a user of the electronic device when the power consumption is larger than an actual charge level of the battery.

7. The performance controller according to claim 1, wherein
   the mode controller notifies a warning to a user of the electronic device when an application program that requires load higher than the application programs recorded in the table is executed.

8. The performance controller according to claim 2, wherein
   the mode controller changes the performance schedule so that power consumption of the electronic device decreases, when the actual charge level is less than a corresponding charge level in the charge level schedule.

9. A performance controller comprising:
   a storage unit that stores a performance schedule showing a plurality of performance levels of the electronic device, the performance schedule being created based on a charge level of a battery used in the electronic device and a table of times at which application programs are executed in the electronic device; and
   a mode controller that sets operation modes of components of the electronic device based on the performance schedule.

10. The performance controller according to claim 9, wherein
    the storage unit further stores a charge level schedule showing change in the charge level; and
    the mode controller sets the operation modes based on a comparison of an actual charge level of the battery with the charge level schedule.

11. An electronic device which is operated by a battery, comprising:
    a performance scheduler that creates a performance schedule showing a plurality of performance levels of the electronic device, based on a charge level of the battery and a table of times at which application programs are executed in the electronic device; and a mode controller that sets operation modes of components of the electronic device based on the performance schedule.

12. An electronic device which is operated by a battery, comprising:
    a storage unit that stores a performance schedule showing a plurality of performance levels of the electronic device, the performance schedule being created based on a charge level of the battery and a table of times at which application programs are executed in the electronic device; and
    a mode controller that sets operation modes of components of the electronic device based on the performance schedule.

13. A method of controlling performance levels of an electronic device, comprising
    creating a performance schedule that shows a plurality of performance levels of the electronic device, based on a charge level of a battery used in the electronic device and a table of times at which application programs are executed in the electronic device; and
    setting operation modes of components of the electronic device based on the performance schedule.

14. A method of controlling performance levels of an electronic device, comprising:
    acquiring from a storage unit a performance schedule showing a plurality of performance levels of the electronic device, the performance schedule being created based on a charge level of a battery used in the electronic device and a table of times at which application programs are executed in the electronic device; and
    setting operation modes of components of the electronic device based on the performance schedule.

15. A computer program product for controlling performance levels of an electronic device, the computer program product including computer executable instructions stored on a computer readable medium, wherein the instructions, when executed by the computer, cause the computer to perform:
    creating a performance schedule that shows a plurality of performance levels of the electronic device, based on a charge level of a battery used in the electronic device and a table of times at which application programs are executed in the electronic device; and
    setting operation modes of components of the electronic device based on the performance schedule.

16. A computer program product for controlling performance levels of an electronic device, the computer program product including computer executable instructions stored on a computer readable medium, wherein the instructions, when executed by the computer, cause the computer to perform:
    acquiring from a storage unit a performance schedule showing a plurality of performance levels of the electronic device, the performance schedule being created based on a charge level of a battery used in the electronic device and a table of times at which application programs are executed in the electronic device; and
    setting operation modes of components of the electronic device based on the performance schedule.

* * * * *

UNITED STATES PATENT AND TRADEMARK OFFICE
CERTIFICATE OF CORRECTION

PATENT NO. : 7,275,170 B2 Page 1 of 1
APPLICATION NO. : 10/764554
DATED : September 25, 2007
INVENTOR(S) : Tomoyuki Suzuki It is certified that error appears in the above-identified patent and that said Letters Patent is hereby corrected as shown below:

Column 13, Line 16, after "comprising" insert --:--.

Signed and Sealed this

First Day of April, 2008

JON W. DUDAS
*Director of the United States Patent and Trademark Office*